(12) United States Patent
Takano et al.

(10) Patent No.: US 9,395,834 B2
(45) Date of Patent: *Jul. 19, 2016

(54) ELECTRONIC DEVICE

(71) Applicant: PANASONIC INTELLECTUAL PROPERTY CORPORATION OF AMERICA, Torrance, CA (US)

(72) Inventors: Tomoki Takano, Kanagawa (JP); Takeshi Yamaguchi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,925

(22) Filed: Nov. 21, 2014

(65) Prior Publication Data

US 2015/0077374 A1 Mar. 19, 2015

Related U.S. Application Data

(63) Continuation of application No. 14/478,455, filed on Sep. 5, 2014, which is a continuation of application No. 14/164,458, filed on Jan. 27, 2014, now Pat. No. 8,913,029.

(30) Foreign Application Priority Data

Mar. 6, 2013 (JP) ................................. 2013-044359

(51) Int. Cl.
*G06F 3/041* (2006.01)
*G06F 3/044* (2006.01)
*G06F 3/0488* (2013.01)

(52) U.S. Cl.
CPC .............. *G06F 3/041* (2013.01); *G06F 3/044* (2013.01); *G06F 3/0416* (2013.01);

(Continued)

(58) Field of Classification Search
CPC ........................................................ G06F 3/041
USPC ........................................................ 345/173
See application file for complete search history.

(56) References Cited

U.S. PATENT DOCUMENTS

2006/0109252 A1   5/2006   Kolmykov-Zotov et al.
2010/0127995 A1   5/2010   Rigazio et al.
(Continued)

FOREIGN PATENT DOCUMENTS

JP   2006-146936   6/2006
JP   2011-232992   11/2011
(Continued)

OTHER PUBLICATIONS

Office Action in Japan Application No. 2014-60295, mail date is May 27, 2014, together with English language translation thereof.

*Primary Examiner* — Jason Olson
(74) *Attorney, Agent, or Firm* — Greenblum & Bernstein, P.L.C.

(57) ABSTRACT

An electronic device includes a planar display and a touch panel, which overlaps the display. The touch panel has a detection zone that covers at least a vertical distance which is less than a first value and greater than a second value which is smaller than the first value and where two dimensional coordinates and the vertical distance can be detected. The detection zone has a first zone that covers the vertical distance from the first value to the second value and includes a center of the touch panel with respect to the two dimensional coordinates. The first zone, in which the vertical distance is a specific value between the first value and the second value, narrows as the specific value increases from the second value toward the first value.

12 Claims, 11 Drawing Sheets

(52) U.S. Cl.
CPC ............ *G06F 3/0418* (2013.01); *G06F 3/0488* (2013.01); *G06F 2203/04101* (2013.01); *G06F 2203/04108* (2013.01)

(56) References Cited

U.S. PATENT DOCUMENTS

2011/0012855 A1    1/2011    Yeh et al.
2011/0267310 A1    11/2011   Tsukahara et al.
2014/0240251 A1    8/2014    Takano et al.

FOREIGN PATENT DOCUMENTS

| | | |
|---|---|---|
| JP | 2012-164060 | 8/2012 |
| JP | 2012-173981 | 9/2012 |
| JP | 2012-212240 | 11/2012 |
| JP | 2012-234386 | 11/2012 |
| JP | 2013-003841 | 1/2013 |
| WO | 2012/173106 | 12/2012 |

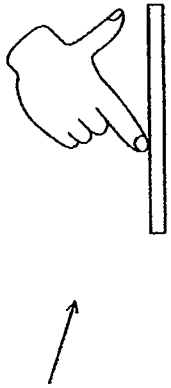
FIG. 11A
FIG. 11B
FIG. 11C
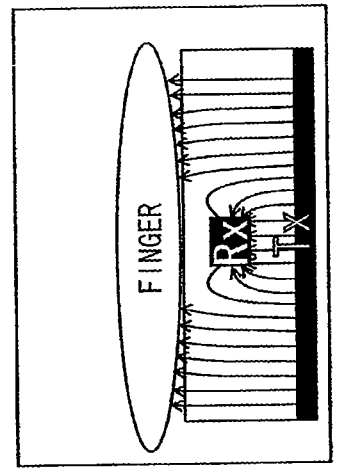
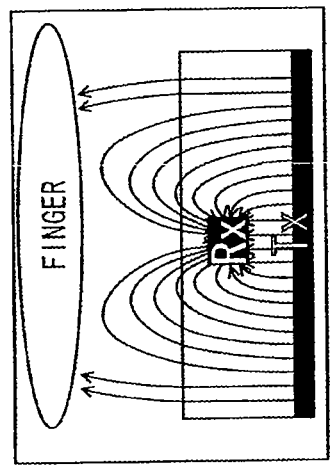
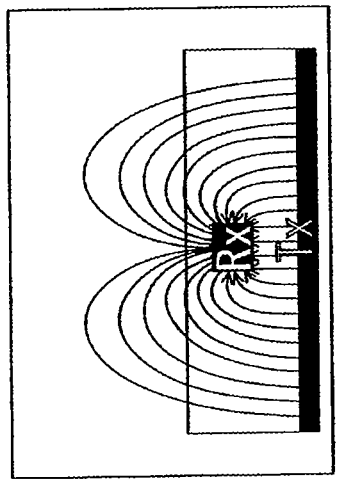

ELECTRONIC DEVICE

CROSS-REFERENCE TO RELATED APPLICATION

This is a continuation application of pending U.S. patent application Ser. No. 14/478,455, filed on Sep. 5, 2014, which is a continuation of Ser. No. 14/164,458, filed Jan. 27, 2014, which claims priority to Japanese Application No. 2013-044359, filed Mar. 6, 2013. The disclosures of these documents, including the specifications, drawings and claims, are incorporated herein by reference in their entirety.

BACKGROUND

The invention relates to an electronic device equipped with a touch panel, and method for detecting coordinates.

As is well known, a touch panel is a combination of a display device, like a liquid crystal panel, with a touch pad (a position input device).

Some touch panels are of a capacitive type. The capacitive type touch panel enables performance of manipulation at a height within a predetermined range without contact of a finger with a panel screen (the proximal operation is hereunder called "hover manipulation"). FIG. 10 is a drawing showing a general configuration of the capacitive type touch panel. In the drawing, transmission electrodes 101 and reception electrodes 102 are disposed at a position distant from each other on a bottom surface of a plate-shaped dielectric 100. A drive pulse is applied from a drive buffer 103 to the transmission electrodes 101. An electric field develops when the drive pulse is applied to the transmission electrodes 101. When a hand is put in the electric field, the number of electric lines of force existing between the transmission electrodes 101 and the reception electrodes 102 decreases. A change in the number of electric lines of force appears as a change in electric charges of the reception electrodes 102. An approach of the hand to the touch panel is detected by the change in the electric charges of the reception electrodes 102.

FIGS. 11A to 11C are drawings showing a state of detection of a finger achieved when the hand is gradually brought closer to the touch panel. FIG. 11A shows a state in which the hand stays away from the electric field; FIG. 11B shows a state of detection of a hovering finger achieved when the finger has entered the electric field; and FIG. 11C shows a state of detection of a finger touch achieved when the finger is fully in the electric field and remains in touch with the touch panel.

Incidentally, when the finger touches the touch panel for manipulation purpose, erroneous manipulation does not occur. However; for instance, when the touch panel is manipulated with one hand, a remaining part of the thumb, such as a base of the thumb, may be detected before coordinates for the thumb are detected. Thus, user's intended manipulation may be hindered.

A method for preventing occurrence of user's unintended manipulation is an input control method described in connection with; for instance, Patent Document JP-A-2012-234386. The input control method includes detecting a touch on a touch panel: specifying a zone including at least a touched area as an invalid zone in which input manipulation is not accepted; and performing input processing relevant to a touched area when a touch on the touch panel is detected and when the touched area does not belong to the invalid zone.

SUMMARY

However, if the invalid zone where input manipulation is not accepted is fixed, in the case of; for instance, hover manipulation that enables performance of manipulation at a distance apart from the touch panel, a virtual size of a finger acquired when viewed from a touch panel will vary according to a distance between a surface of the display section and the finger. Therefore, user's unintended manipulation cannot be sufficiently prevented.

The invention has been conceived in light of the circumstance and aims at providing an electronic device and a method of detecting coordinates capable of sufficiently preventing a user from performing unintended manipulation during hover manipulation that enables performance of manipulation at a position distant from a touch panel.

According to one aspect of the invention, there is provided an electronic device comprising: a planar display section; and a touch panel that is placed while overlapping the display section and that can detect two dimensional coordinates of an indicator on a surface of the display section and a vertical distance from the indicator, wherein the touch panel has a detection zone that covers at least the vertical distance which is less than a first value and greater than a second value which is smaller than the first value and where the two dimensional coordinates and the vertical distance can be detected, and a non-detection zone that covers at least the vertical distance which is greater than the first value and where the two dimensional coordinates and/or the vertical distance cannot be detected; the detection zone has a first zone that includes a center of the touch panel in connection with the two dimensional coordinates and a second zone that is outside the first zone in connection with the two dimensional coordinates; and at least the two dimensional coordinates of the indicator are taken as valid coordinates when the indicator directly enters the first zone from the non-detection zone, and at least the two dimensional coordinates of the indicator are taken as invalid coordinates when the indicator directly enters the second zone from the non-detection zone.

At least the two dimensional coordinates of the indicator may be taken as valid coordinates when the indicator directly enters the first zone from the non-detection zone, at least the two dimensional coordinates of the indicator may be taken as invalid coordinates when the indicator directly enters the second zone from the non-detection zone, and at least two dimensional coordinates of the indicator may be taken as valid coordinates when the indicator enters the second zone after directly entering the first zone from the non-detection zone.

At least the two dimensional coordinates of the indicator may be taken as valid coordinates when the indicator directly enters the first zone from the non-detection zone, at least the two dimensional coordinates of the indicator may be taken as invalid coordinates when the indicator directly enters the second zone from the non-detection zone, at least the two dimensional coordinates of the indicator may be taken as valid coordinates when the indicator enters the second zone after directly entering the first zone from the non-detection zone, and at least the two dimensional coordinates of the indicator may be taken as valid coordinates when the indicator enters the first zone after directly entering the second zone from the non-detection zone.

At least the two dimensional coordinates of the indicator may be taken as valid coordinates when the indicator directly enters the first zone from the non-detection zone; at least the two dimensional coordinates of the indicator may be taken as invalid coordinates when the indicator directly enters the second zone from the non-detection zone, at least the two dimensional coordinates of the indicator may be taken as valid coordinates when the indicator enters the second zone after directly entering the first zone from the non-detection zone, at least the two dimensional coordinates of the indicator may be taken as valid coordinates when the indicator enters the first zone after directly entering the second zone from the non-detection zone, and at least the two dimensional coordinates of the indicator may be taken as valid coordinates when the indicator enters the first zone after directly entering the second zone from the non-detection zone and subsequently entering the second zone.

The non-detection zone may have an area outside the detection zone with reference to a center of the touch panel in connection with the vertical distance.

The second value may be zero. The valid second coordinates can be displayed on the display section.

According to another aspect of the present invention, there is provided a method for detecting coordinates of an indicator applicable to an electronic device comprising: a planar display section; and a touch panel that is placed while overlapping the display section and that can detect two dimensional coordinates of the indicator on a surface of the display section and a vertical distance from the indicator, wherein the touch panel has a detection zone that covers at least the vertical distance which is less than a first value and greater than a second value which is smaller than the first value and where the two dimensional coordinates and the vertical distance can be detected, and a non-detection zone that covers at least the vertical distance which is greater than the first value and where the two dimensional coordinates and/or the vertical distance cannot be detected; and the detection zone has a first zone that includes a center of the touch panel in connection with the two dimensional coordinates and a second zone that is outside the first zone in connection with the two dimensional coordinates; and wherein at least the two dimensional coordinates of the indicator are taken as valid coordinates when the indicator directly enters the first zone from the non-detection zone, and at least the two dimensional coordinates of the indicator are taken as invalid coordinates when the indicator directly enters the second zone from the non-detection zone.

BRIEF DESCRIPTION OF THE DRAWINGS

FIGS. 11A to 11C are drawings showing a state of detection of a finger achieved when a hand is gradually brought closer to the touch panel.

DETAILED DESCRIPTION OF EMBODIMENTS

A preferred embodiment for implementing the invention is hereunder described in detail by reference to the drawings.

Figure 1:
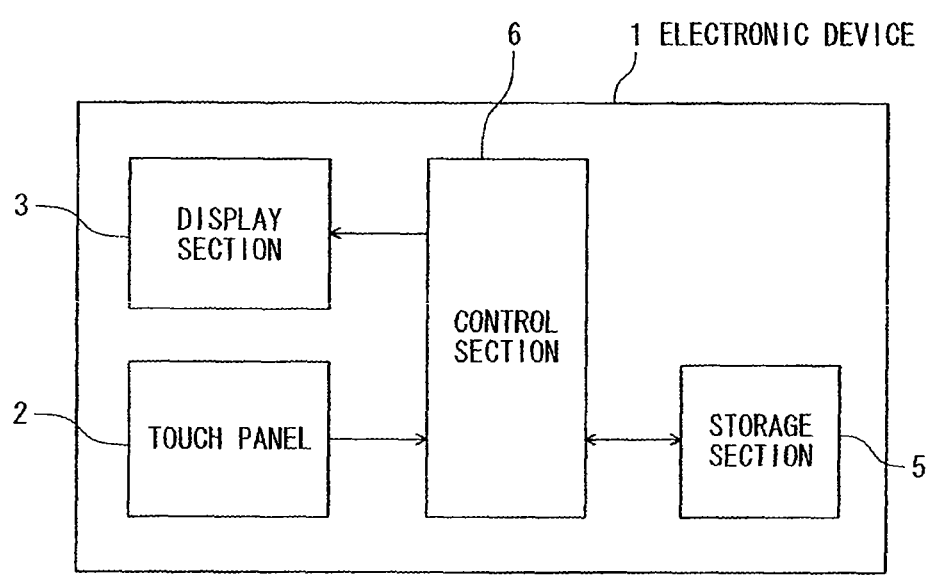
FIG. 1 is a block diagram showing a general configuration of an electronic device of an embodiment of the invention.
Figure 2:
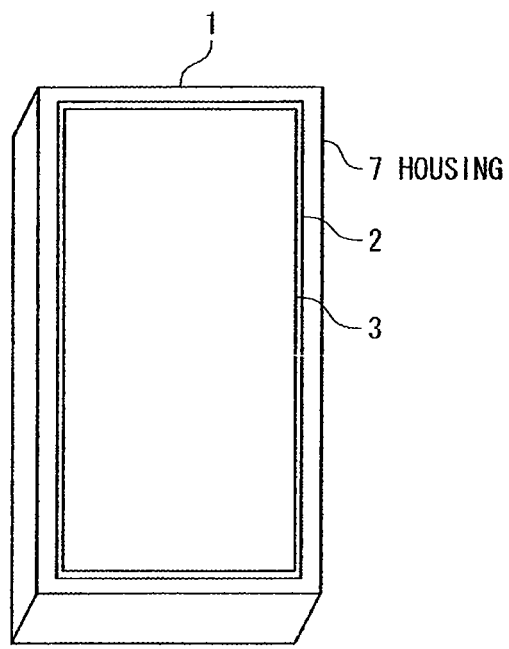
FIG. 2 is a perspective view showing an external view of the electronic device shown in FIG. 1.

FIG. 1 is a block diagram showing a general configuration of an electronic device of an embodiment of the invention. FIG. 2 is a perspective view showing an external view of the electronic device shown in FIG. 1. In this connection, the electronic device 1 of the embodiment corresponds to an application of the invention to; for instance, a portable radio communication device called a smartphone. A part of the electronic device that works as a radio communication device is omitted from the block diagram shown in FIG. 1.

In FIG. 1, the electronic device 1 of the embodiment has a touch panel 2, a display section 3, a storage section 5, and a control section 6. As shown in FIG. 2, the electronic device 1 of the embodiment has a longitudinally, rectangular housing 7. The touch panel 2 and the display section 3 are provided on a front face of the housing 7. Each of the touch panel 2 and the display section 3 assumes a planar shape that is slightly smaller than an area of the front face of the housing 7 and is formed into a longitudinally, rectangular shape when viewed from top. In this case, an area of the display section 3 is slightly smaller than an area of the touch panel 2. The touch panel 2 is placed and superimposed over a front face of the display section 3.

Figure 10:
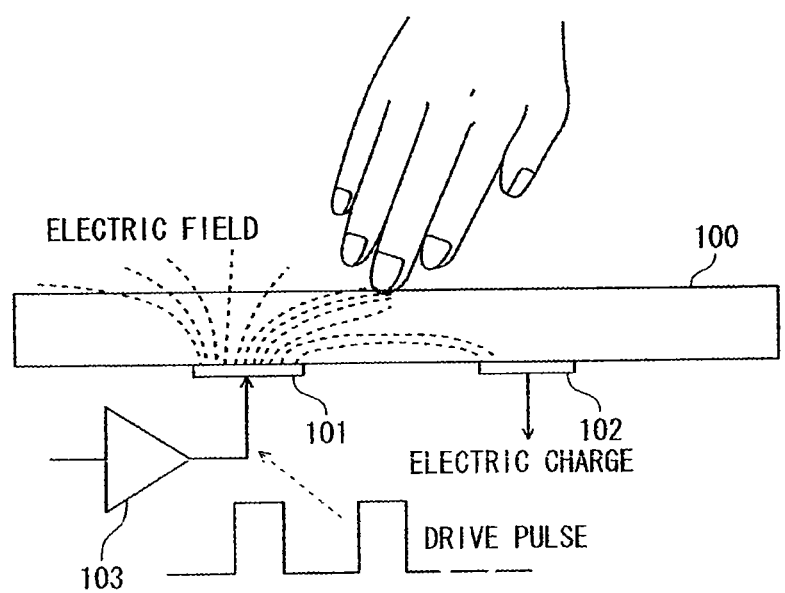
FIG. 10 is a drawing showing a general configuration of a capacitive type touch panel.

The touch panel 2 adopts a capacitive system that enables performance of manipulation ("hover manipulation") at a height within a predetermined range without contact of an indicator (a user's finger, a pen, or the like, and the indicator is herein taken as a "finger" in the embodiment) with a panel surface of the touch panel 2. As shown in FIG. 10, the touch panel 2 adopting the capacitive system is equipped with transmission electrodes 101 and reception electrodes 102, and the electrodes are positioned at a distance with each other and on a bottom surface of a plate-shaped dielectric 100. A drive pulse derived from a transmission signal is applied to the transmission electrodes 101. The transmission electrodes 101 receive the applied drive pulse, whereupon an electric field develops. When the finger enters the electric field, the number of electric lines of force between the transmission electrodes 101 and the reception electrodes 102 decreases, and a change in the number of electric lines of force appears as a change in electric charge of the reception electrodes 102. The touch panel 2 detects the finger in accordance with a received signal corresponding to the change in electric charges of the reception electrodes 102; detects two dimensional coordinates (x, y) of the finger along a surface of the display section 3; detects a vertical distance (z) between the finger serving as the indicator and the surface of the display section 3; and outputs the thus-detected two dimensional coordinates (x, y) and the vertical distance (z) to the control section 6.

The display section 3 assumes a rectangular shape and is employed as a display for manipulating the electronic device 1 or a display of an image or the like. A display device, such as an LCD (Liquid Crystal Display), an organic EL (Electro Luminescence), and electronic paper, is used for the display section 3. The storage section 5 has volatile memory, like DRAM (Dynamic Random Access Memory), and stores settings when a user makes the settings for using the electronic device 1.

The control section 6 is made up of a CPU (Central Processing Unit), ROM (Read Only Memory), RAM (Random Access Memory), and an interface circuit. A program for controlling the CPU is stored in the ROM, and the RAM is used for operation of the CPU. The control section 6 has, as operation modes, a pointer mode and a normal mode. The pointer mode is one used at the time of manipulation of a pad, whilst the normal mode is one in which a touched position coincides with a function active position.

Manipulation performed in the pointer mode corresponds to indirect manipulation (i.e., the above-mentioned hover manipulation) that is performed over the touch panel 2 rather than manipulation entailing a direct contact with the touch panel 2 as in the case with the normal mode. The finger is held in midair within a predetermined zone and a predetermined distance range over the touch panel 2, whereupon switching to the pointer mode takes place. The finger is moved after occurrence of switching to the pointer mode, whereby a pointer (omitted from the drawings) follows the finger. In the pointer mode, a predetermined function is executed in response to the position of the pointer.

Figure 3:
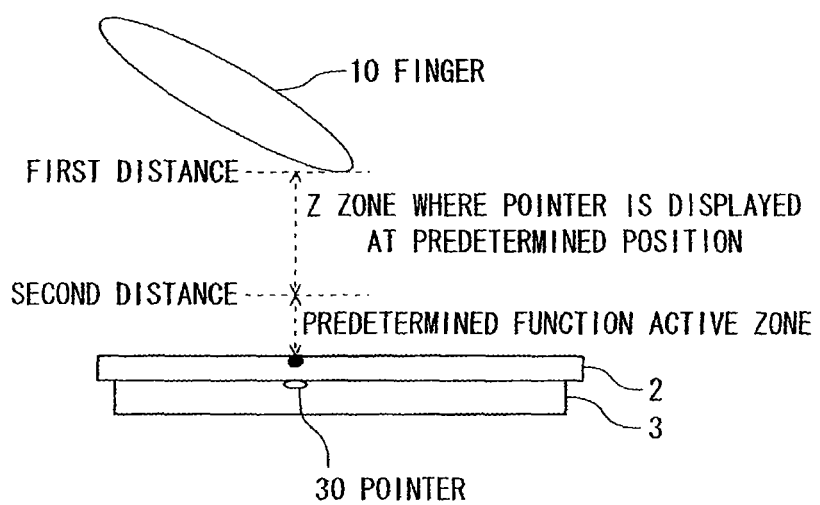
FIG. 3 is a diagram showing a positional relationship between a touch panel of the electronic device shown in FIG. 1 and a finger which serves as an indicator.

FIG. 3 is a diagram showing a positional relationship between the touch panel 2 and a finger 10 that serves as the indicator. As illustrated, the finger 10 is held in midair over the touch panel 2 within a distance range between a first distance (a first value) or less and a second distance (a second value) that is shorter than the first distance, whereby switching to the pointer mode takes place. As a result of switching to the pointer mode having taken place, coordinates (x, y, z) of the hovering finger 10 are detected. The finger is displayed as a pointer 30 at a position on the surface of the display section 3 that corresponds to the coordinates (x, y, z) where the finger 10 is detected. When the pointer 30 overlaps with an icon (omitted from the drawings), the icon is made selectable. When the finger 10 has approached the touch panel 2 within the second distance or less, a function assigned to the icon is activated. Displaying the pointer 30 and activating the function assigned to the icon are performed by the control section 6. Incidentally, the second distance can be set to zero. In addition, the pointer 30 can also be displayed in the form of a dot, such as that shown in FIG. 3, or in a symbol like an arrow.

Figure 4:
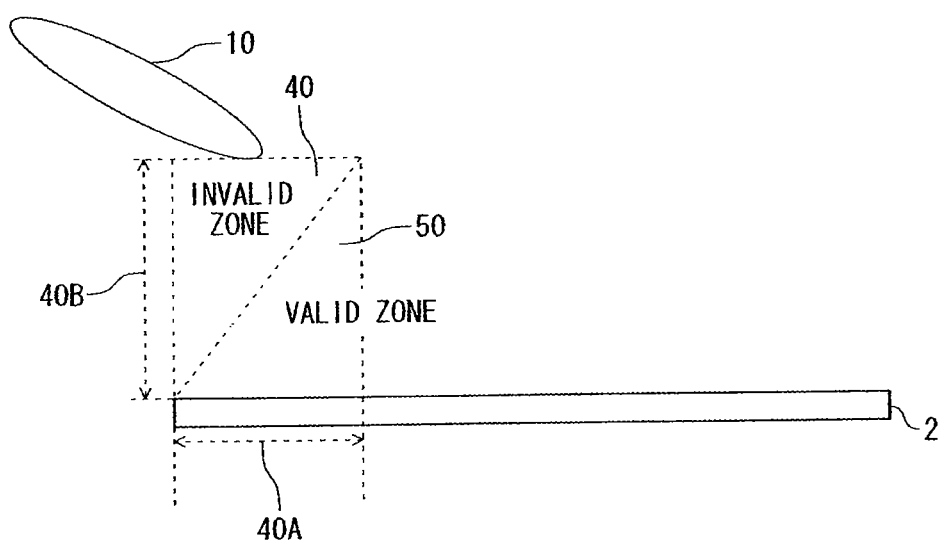
FIG. 4 is a diagram schematically showing an invalid zone and a valid zone above the touch panel of the electronic device shown in FIG. 1.
Figure 5:
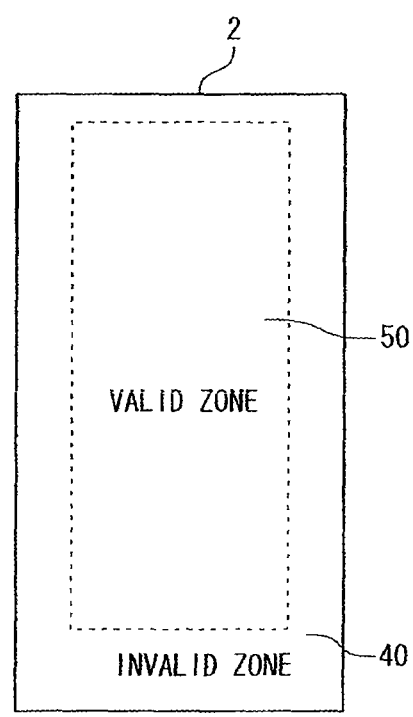
FIG. 5 is a plan view showing the invalid zone and the valid zone above the touch panel of the electronic device shown in FIG. 1.

The control section 6 loads the coordinates (x, y, z) output from the touch panel 2 in; for instance, the pointer mode. A valid zone (a two dimensional coordinate valid zone; namely, a first zone) is set in accordance with a vertical distance (z) between the finger 10 and the touch panel 2. In this case, the control section 6 makes the valid zone narrower as the vertical distance (z) between the finger 10 and the touch panel 2 becomes greater. FIG. 4 is a diagram schematically showing an invalid zone and (a part of) the valid zone above the touch panel 2. FIG. 5 is a plan view showing the invalid zone and the valid zone above the touch panel 2. In FIG. 4, an invalid zone 40 is one that includes an invalid X-Y zone 40A corresponding to X and Y directions of the touch panel 2 and an invalid Z zone 40B corresponding to Z direction of the touch panel 2. The invalid zone 40 spreads to the inside of the touch panel 2 as the vertical distance (z) between the finger 10 and the touch panel 2 becomes greater, and a valid zone 50 becomes narrower in contradistinction to the spread of the invalid zone (a second zone) 40. In this case, the invalid zone 40 spreads to the inside of the touch panel 2, so that the valid zone 50 comes to assume a trapezoidal geometry. In reality, the valid zone 50 comes to assume a three-dimensional trapezoidal shape (see FIG. 7 to be described later). A planar geometry of the valid zone 50 is a square shape as in the case with the display section 3. In this case, as a matter of course, when the vertical distance (z) between the finger 10 and the touch panel 2 is greater than a predetermined value (a distance at which the finger has touched the touch panel 2; i.e., a distance of substantially zero) (namely, when the finger is hovering), the valid zone 50 becomes smaller than the square of the display section 3. The valid zone 50 becomes smaller as the vertical distance (z) between the finger 10 and the touch panel 2 becomes greater. When the distance (z) becomes minimum, the valid zone 50 becomes maximum.

Figure 6:
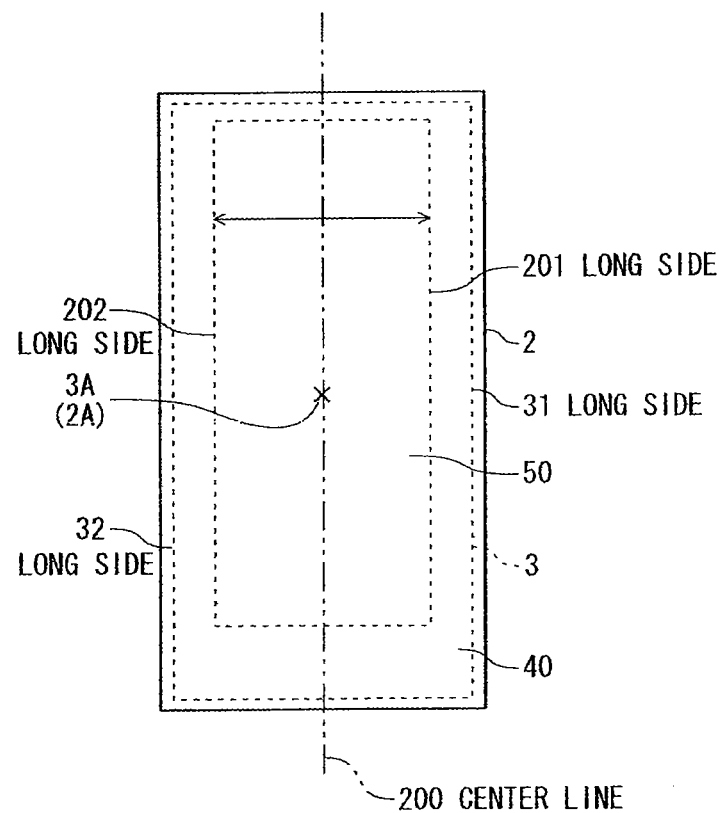
FIG. 6 is a diagram for explaining an example setting of the valid zone above the touch panel of the electronic device shown in FIG. 1.

The followings are conceivable. For instance, as shown in FIG. 6, the valid zone 50 is made narrower while including a center 3A of the display section 3. Also, at least a distance (designated by a direction of a double-headed arrow in the drawing) between mutually-opposed long sides 201, 202 in the rectangle of the valid zone 50 is made narrower as the vertical distance (z) between the finger 10 and the touch panel 2 becomes greater. Alternatively, the long sides 201, 202 of the valid zone 50 are moved toward a center line 200 drawn along the long sides 31, 32 of the rectangle of the display section 3 as the vertical distance (z) between the finger 10 and the touch panel 2 becomes greater.

The control section 6 determines whether the coordinates (x, y, z) of the finger 10 that serves as an indicator are valid or invalid as follows.

Figure 7:
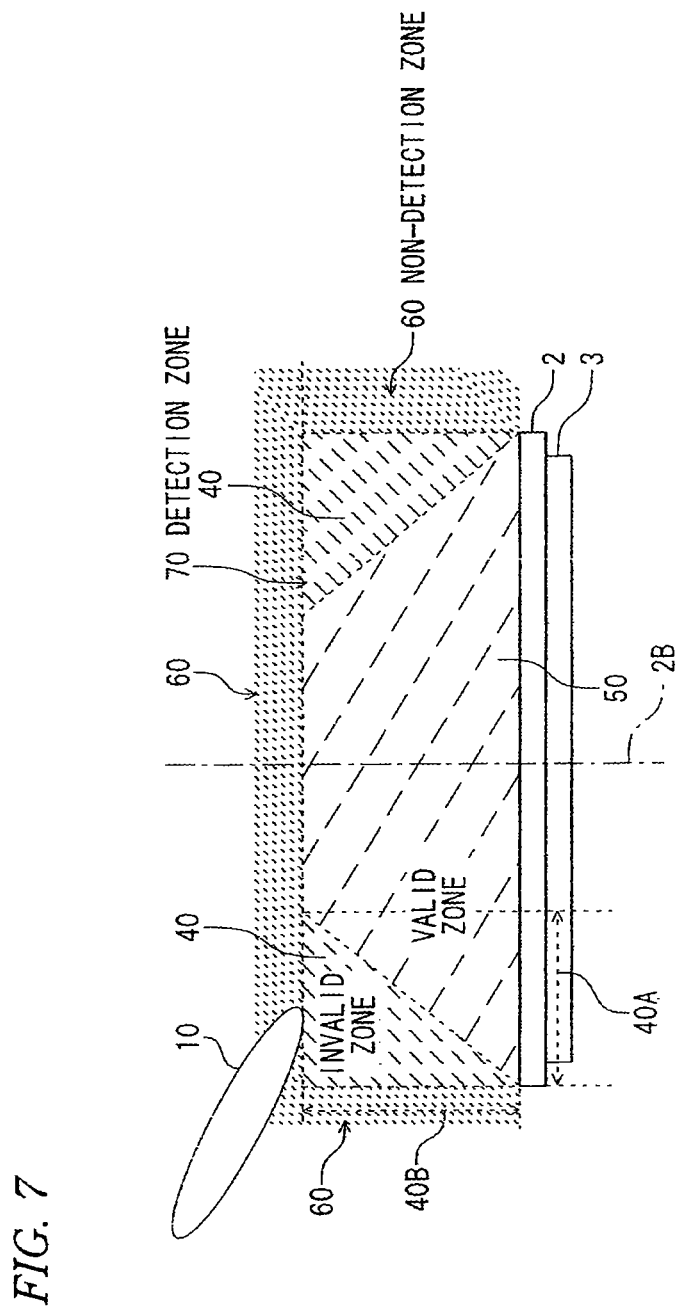
FIG. 7 is a diagram schematically showing a non-detection zone and a detection zone above the touch panel of the electronic device shown in FIG. 1.

A non-detection zone to be described below is an area where the control section 6 cannot recognize the finger. The detection zone to be described below includes the valid zone 50 for two dimensional coordinates including a center 2A of the touch panel 2 and the invalid zone 40 for two dimensional coordinates located outside the valid zone 50. In the detection zone, the control section 6 can recognize the finger. FIG. 7 is a diagram schematically showing the non-detection zone and the detection zone. In the drawing, in connection with the vertical distance (z) between the finger 10 and the touch panel 2, a non-detection zone 60 includes an area located outside a detection zone 70 with reference to a center line 2B of the touch panel 2. As referred to above, the detection zone 70 includes the invalid zone 40 and the valid zone 50.

First coordinates of the indicator are defined as follows:

(1-1) When the touch panel 2 remaining in a non-detection state has detected the indicator, coordinates detected at this time are taken as first coordinates.

(1-2) When the indicator has moved from the non-detection zone 60 to the detection zone 70, coordinates detected this time are taken as first coordinates.

(1-3) When entry of the indicator into the detection zone 70 is detected, coordinates detected at this time are taken as first coordinates.

In consideration of these definitions of the first coordinates, the control section 6 determines whether the coordinates (x, y, z) of the indicator are valid or invalid. Even in this case, the finger 10 is taken as the indicator.

(2-1) When the coordinates (x, y, z) of the finger 10 at the first coordinates (regardless of what number the finger 10 is) belong to the invalid zone 40, the coordinates (x, y, z) are made invalid.

(2-2) When the invalidated finger 10 has moved to the valid zone 50 without moving to the non-detection zone 60, the coordinates (x, y, z) in the valid zone 50 are taken as valid coordinates.

(2-3) Coordinates (x, y, z) in the invalid zone 40 are taken as invalid coordinates, unless the invalidated finger 10 moves to the valid zone 50.

(2-4) Even in a case where there is the invalidated finger 10 (a first finger 10-1), when a second finger 10-2 whose coordinates are first coordinates is detected in the valid zone 50, coordinates (x, y, z) of the second finger 10-2 are taken as valid coordinates. In this case, the second finger 10-2 is notified to the host as the first finger 10-1. When the electronic device is; for instance, a smartphone, the host corresponds to an OS (operating system) employed in the smartphone.

(2-5) When the finger 10 once detected in the valid zone 50 has entered the invalid zone 40, coordinates of the finger are taken as valid coordinates rather than being invalidated.

The control section 6 displays the pointer 30 at a position on the screen of the display section 3 corresponding to the coordinates (x, y) within the valid zone 50. If the pointer 30 is situated on the icon (omitted from the drawings) displayed on the display section 3, the icon is determined to have been selected by the user, and when the finger 10 of the user has approached the touch panel 2 within the second distance or less, a function assigned to the icon is activated.

Figure 8:
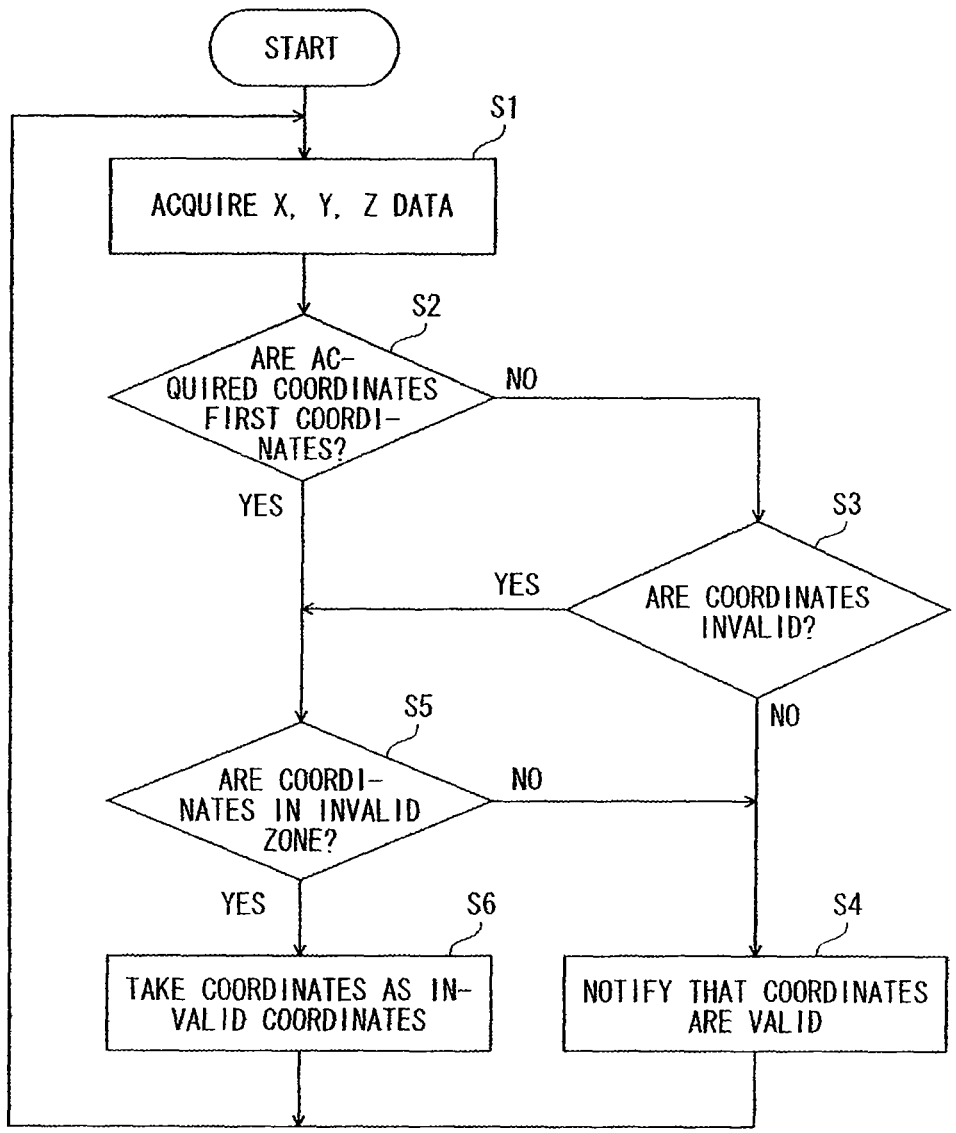
FIG. 8 is a flowchart for explaining processing in which a control section of the electronic device shown in FIG. 1 determines if two dimensional coordinates are valid or invalid.

FIG. 8 is a flowchart for explaining processing in which the control section 6 determines if two dimensional coordinates are valid or invalid. In the drawing, the control section 6 acquires current coordinates (x, y, z) of the finger 10 output from the touch panel 2 (step S1). Next, a determination is made as to whether or not the thus-acquired coordinates are first coordinates (step S2). If the coordinates are not the first coordinates (when "NO" is rendered in the determination), a determination is made as to whether or not the coordinates are invalidated (step S3). When the coordinates are not invalidated (when "NO" is rendered in the determination), the acquired coordinates are taken as valid coordinates, and the result is notified to the foregoing OS (step S4). Subsequently, processing returns to step S1. On the contrary, when the acquired coordinates are the first coordinates (in other words, when "YES" is rendered in step S2) or when the coordinates are invalidated (in other words, "YES" is rendered in step S3), a determination is further made as to whether or not the coordinates belong to the invalid zone 40 (step S5). When the coordinates do not belong to the invalid zone 40 (namely, when "NO" is rendered in the determination), a message showing that the coordinates are valid is notified to the OS (step S4). Subsequently, processing returns to step S1. By contrast, when the coordinates belong to the invalid zone 40 (namely, when "YES" is rendered in the determination in step S5), the coordinates are taken as invalid coordinates, and the result is not notified to the OS (step S6). Processing subsequently returns to step S1.

In the case of determination (2-1), processing follows a flow of step S1, step S2 ("YES"), step S5 ("YES"), and step S6. In the case of determination (2-2), processing follows a flow of step S1, step S2 ("NO"), step S3 ("YES"), step S5 ("NO"), and step S4 after following the flow of (2-1). In the case of determination (2-3), processing follows a flow of step S1, step S2 ("NO"), step S3 ("YES"), step S5 ("YES"), and step S6 after following the flow of (2-1). In addition, in the case of determination (2-4), processing follows a flow of step S1, step S2 ("YES"), step S5 ("NO"), and step S4. In the case of (2-5), "NO" is rendered in step S3 or S5, and processing then follows a flow to step S4. Subsequently, processing follows a path of step S1, step S2 ("NO"), step S3 ("NO"), and step S4.

As mentioned above, the electronic device 1 of the embodiment is equipped with the planar display section 3, the two dimensional coordinates (x, y) of the finger 10, which serves as the indicator, on the surface of the display section 3; and the touch panel 2 capable of detecting the vertical distance (z) from the finger 10. As the vertical distance (z) between the finger 10 and the touch panel 2 becomes greater, the valid zone 50 where the two dimensional coordinates (x, y) are validated is made narrower. Accordingly, user's unintended manipulation, which would otherwise be performed during hover manipulation that enables performance of manipulation at an elevated position above the touch panel 2, can be sufficiently prevented.

Figure 9:
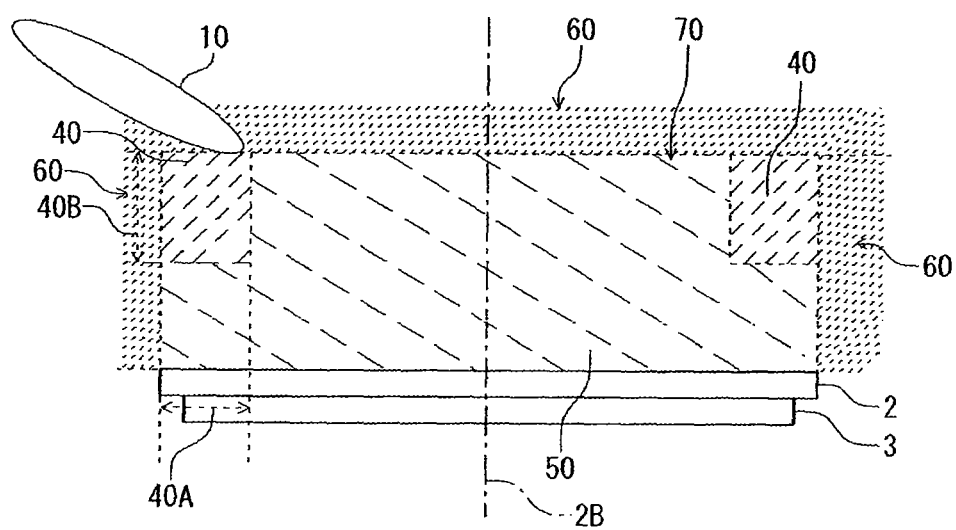
FIG. 9 is a drawing showing an example application of a setting of a valid zone on the touch panel of the electronic device shown in FIG. 1, or an example of two-step switching.

In the electronic device 1 of the embodiment, the valid zone (the two dimensional coordinate valid zone) can also be switched in at least two steps. FIG. 9 is a drawing showing an example of two-step switching.

Although the electronic device 1 of the embodiment stores in ROM a program which describes processing represented by the flowchart shown in FIG. 8, the program can also be distributed while being stored in a storage medium, such as a magnetic disc, an optical disc, a magneto-optical disc, and flash memory or downloaded by utilization of a telecommunication line while being stored in a server (omitted from the drawings) in a network, like the Internet.

The electronic device 1 of the embodiment corresponds to the application of the invention to a portable radio called a smartphone. However, in addition to the portable radio, the invention is also applicable to a home electric appliance, such as a microwave oven, a control panel of an automobile navigation system, and the like.

As can be seen above, the configuration of the embodiment according to the invention makes a two dimensional coordinate valid zone narrower as a vertical distance from an indicator (e.g., a "finger") increases. During hover manipulation that enables performance of manipulation at a position distant from the touch panel, performance of user's unintended manipulation can be sufficiently prevented.

The method makes it possible to sufficiently prevent performance of user's unintended manipulation, which would otherwise occur during hover manipulation that enables performance of manipulation at a position distant from a touch panel.

The invention makes it possible to sufficiently prevent performance of user's unintended manipulation, which would otherwise occur during hover manipulation that enables performance of manipulation at a position distant from a touch panel.

The invention yields an advantage of the ability to sufficiently prevent user's unintended manipulation, which would otherwise be performed during hover manipulation that enables performance of manipulation at a position distant from a touch panel. Thus, the invention is applicable to an electronic device using a capacitive type touch panel, such as a smartphone.

What is claimed is:

1. An electronic device comprising:
    a planar display; and
    a touch panel that overlaps the display and that can detect two dimensional coordinates of an indicator on a surface of the display and a vertical distance from the indicator, wherein
    the touch panel comprises
        a detection zone that covers at least a vertical distance which is less than a first value and greater than a second value which is smaller than the first value and where the two dimensional coordinates and the vertical distance can be detected, and
        a non-detection zone that covers at least the vertical distance which is greater than the first value and where at least one of the two dimensional coordinates and the vertical distance cannot be detected,
    the detection zone has
        a first zone that covers the vertical distance from the first value to the second value and includes a center of the touch panel with respect to the two dimensional coordinates and a second zone that covers at least a part of the vertical distance from the first value to the second value and is outside the first zone with respect to the two dimensional coordinates, the first zone, in which the vertical distance is a certain value between the first value and the second value, narrows as the certain value increases from the second value toward the first value, at least the two dimensional coordinates of the indicator are taken as valid coordinates when the indicator directly enters the first zone from the non-detection zone where the vertical distance is greater than the first value, and at least the two dimensional coordinates of the indicator are taken as valid coordinates when the indicator then enters the second zone from the first zone, and at least the two dimensional coordinates of the indicator are taken as invalid coordinates when the indicator directly enters the second zone from the non-detection zone, at least the two dimensional coordinates of the indicator are taken as valid coordinates when the indicator then enters the first zone from the second zone, and at least the two dimensional coordinates of the indicator are taken as valid coordinates when the indicator then enters the second zone from the first zone.

2. The electronic device according to claim 1, wherein the first zone narrows with the first zone including a center of the display as the vertical distance increases.

3. The electronic device according to claim 2, wherein the first zone narrows toward the center of the display as the vertical distance increases.

4. The electronic device according to claim 1, wherein the first zone becomes a maximum when the vertical distance becomes a minimum.

5. The electronic device according to claim 1, wherein the first zone is narrowed in at least two steps.

6. The electronic device according to claim 1, wherein the display and the first zone comprise square shapes, and the square shape of the first zone is smaller than at least the square shape of the display when the vertical distance is larger than a certain value.

7. The electronic device according to claim 6, wherein the square shape of the first zone becomes smaller as the vertical distance becomes large.

8. The electronic device according to claim 6, wherein the display and the first zone comprise rectangular shapes, at least a distance between mutually-opposed long side of the rectangle of the first zone narrows as the vertical distance increases.

9. The electronic device according to claim 8, wherein at least the long sides of the first zone moves toward a center line extending along long sides of the rectangle of the display as the vertical distance increases.

10. The electronic device according to claim 1, wherein the second value is zero.

11. The electronic device according to claim 1, wherein the valid two dimensional coordinates can be displayed on the display.

12. A method for detecting coordinates of an indicator applicable to an electronic device comprising:

a planar display; and a touch panel that overlaps the display and that can detect two dimensional coordinates of an indicator on a surface of the display and a vertical distance from the indicator, wherein the touch panel includes a detection zone that covers at least a vertical distance which is less than a first value and greater than a second value which is smaller than the first value and where the two dimensional coordinates and the vertical distance can be detected, and a non-detection zone that covers at least the vertical distance which is greater than the first value and where at least one of the two dimensional coordinates and the vertical distance cannot be detected, the detection zone has a first zone that covers the vertical distance from the first value to the second value and includes a center of the touch panel with respect to the two dimensional coordinates and a second zone that covers at least a part of the vertical distance from the first value to the second value and is outside the first zone with respect to the two dimensional coordinates, the first zone, in which the vertical distance is a certain value between the first value and the second value, narrows as the certain value increases from the second value toward the first value, the method comprising:

taking at least the two dimensional coordinates of the indicator as valid coordinates when the indicator directly enters the first zone from the non-detection zone where the vertical distance is greater than the first value, and taking at least the two dimensional coordinates of the indicator as valid coordinates when the indicator then enters the second zone from the first zone, and taking at least the two dimensional coordinates of the indicator as invalid coordinates when the indicator directly enters the second zone from the non-detection zone, taking at least the two dimensional coordinates of the indicator as valid coordinates when the indicator then enters the first zone from the second zone, and taking at least the two dimensional coordinates of the indicator as valid coordinates when the indicator then enters the second zone from the first zone.

* * * * *